United States Patent
Naganathan et al.

(10) Patent No.: US 9,122,716 B1
(45) Date of Patent: Sep. 1, 2015

(54) DATABASE UPGRADE MANAGEMENT

(71) Applicant: SHORETEL, INC., Sunnyvale, CA (US)

(72) Inventors: Venkatraman Naganathan, San Jose, CA (US); Glen K. Okita, Los Altos, CA (US)

(73) Assignee: SHORETEL, INC., Sunnyvale, CA (US)

( * ) Notice: Subject to any disclaimer, the term of this patent is extended or adjusted under 35 U.S.C. 154(b) by 169 days.

(21) Appl. No.: 13/713,821

(22) Filed: Dec. 13, 2012

(51) Int. Cl.
*G06F 17/30* (2006.01)

(52) U.S. Cl.
CPC .... *G06F 17/30371* (2013.01); *G06F 17/30545* (2013.01)

(58) Field of Classification Search
CPC ............... G06F 17/30545; G06F 17/30563
USPC .......... 707/609, 803, 806–809, 762; 717/168, 717/169
See application file for complete search history.

(56) References Cited

U.S. PATENT DOCUMENTS

| | | | |
|---|---|---|---|
| 5,432,931 A | 7/1995 | Woess et al. | |
| 5,933,837 A | 8/1999 | Kung | |
| 7,310,653 B2 | 12/2007 | Coyle et al. | |
| 7,526,576 B2 | 4/2009 | Bank et al. | |
| 7,577,685 B2 | 8/2009 | Meier et al. | |
| 7,577,687 B2 | 8/2009 | Bank et al. | |
| 7,580,970 B2 | 8/2009 | Bank et al. | |
| 7,584,131 B1* | 9/2009 | Kurtz et al. | 705/36 R |
| 7,707,177 B2 | 4/2010 | Bank et al. | |
| 7,844,639 B2 | 11/2010 | Cohen et al. | |
| 8,407,237 B1* | 3/2013 | Kudryavtsev et al. | 707/762 |
| 2004/0015521 A1* | 1/2004 | Hudicka | 707/200 |
| 2005/0050076 A1* | 3/2005 | Tong et al. | 707/100 |
| 2012/0036166 A1* | 2/2012 | Qiu et al. | 707/803 |

OTHER PUBLICATIONS

Philippe Thiran et al., Wrapper-Based Evolution of Legacy Information Systems, Oct. 2006, ACM, vol. 15, No. 4, 329-359.*

* cited by examiner

*Primary Examiner* — Jean B Fleurantin
(74) *Attorney, Agent, or Firm* — Tarolli, Sundheim, Covell & Tummino LLP

(57) ABSTRACT

A system can include an upgrade system manager. The upgrade system manager can be configured to communicate with an upgrade database that employs a given schema. The system can also include a legacy system manager configured to communicate with a legacy database that employs a different schema, wherein the legacy database contains a subset of the data stored at the upgrade database. The legacy database can be configured to provide a forward migration trigger to the upgrade system manager in response to detecting an update to the legacy database. The upgrade system manager can further be configured to determine whether data received from an application configured to produce data for the upgrade database is to be provided to the legacy database.

25 Claims, 12 Drawing Sheets

DATABASE UPGRADE MANAGEMENT

TECHNICAL FIELD

Systems and methods for managing a database upgrade are disclosed.

BACKGROUND

A database is an organized collection of data, in digital form. The data in a database can be organized to model relevant aspects of reality, in a way that supports processes that require this information. A database can have a model that describes a theoretical foundation of the database and fundamentally determines in which manner data can be stored, organized, and manipulated in a database system.

A database can be implemented with a particular schema and binaries. The schema describes the organization and format of the database (e.g., the tables used to identify and describe the data stored in the database and the relationships between the tables). The binaries represent the actual data, which is typically stored in the format specified by the schema.

SUMMARY

This disclosure relates to database upgrade management.

One example relates to a system for managing an upgrade database and a legacy database. The system can comprise an upgrade system manager stored in a memory. The upgrade system manager can be configured to communicate with the upgrade database that employs a given schema. The system can also comprise a legacy system manager stored in the memory. The legacy system manager can be configured to communicate with the legacy database that employs another schema, wherein the legacy database contains a subset of the data stored at the upgrade database. The legacy database can be configured to provide a forward migration trigger to the upgrade system manager in response to detecting an update to the legacy database. The upgrade system manager can be further configured to determine whether data received from an application configured to produce data for the upgrade database is to be provided to the legacy database.

Another example relates to a method for managing an upgrade database and a legacy database. The method can include receiving data from an application. The method can also include determining whether to provide the data to a legacy database, the determination being based on a type of the data. The method can further comprise updating an upgrade database that employs a given schema based on the data received from the application. The upgrade database can contain a superset of data stored at the legacy database that employs another schema.

Yet another example is related to a system for upgrading a database. The system can comprise a memory configured to store machine readable instructions. The system can also include a processing unit to access the memory and execute the machine readable instructions. The machine readable instructions can comprise an upgrade adapter configured to detect data being provided from an application for a legacy database that employs a given schema. The upgrade adapter can also provide an update command in response to the data provided from the application to an upgrade database that employs another schema. The upgrade database includes a complete set of data stored on the legacy database.

DETAILED DESCRIPTION

This disclosure relates to managing an upgrade for a database. As an example, an upgrade database is provided. The upgrade database can be generated from a legacy database. The upgrade database and the legacy database can employ different schemas. In particular, the upgrade database can employ schema 'V,' while the legacy database can employ schema 'V-n.' As used herein, schema 'V' is an upgraded version of a prior schema V-n, where n is a positive integer denoting a previous (non-upgraded version). In some examples, both databases can run concurrently wherein at least some of the data updated at the upgrade database is provided to the legacy database, while each update to the legacy database is forward migrated to the upgrade database. In other examples, only the upgrade database that employs an adapter is running (e.g., live). The examples disclosed herein thus can allow for incremental upgrading of individual databases in a distributed database system.

Figure 1:
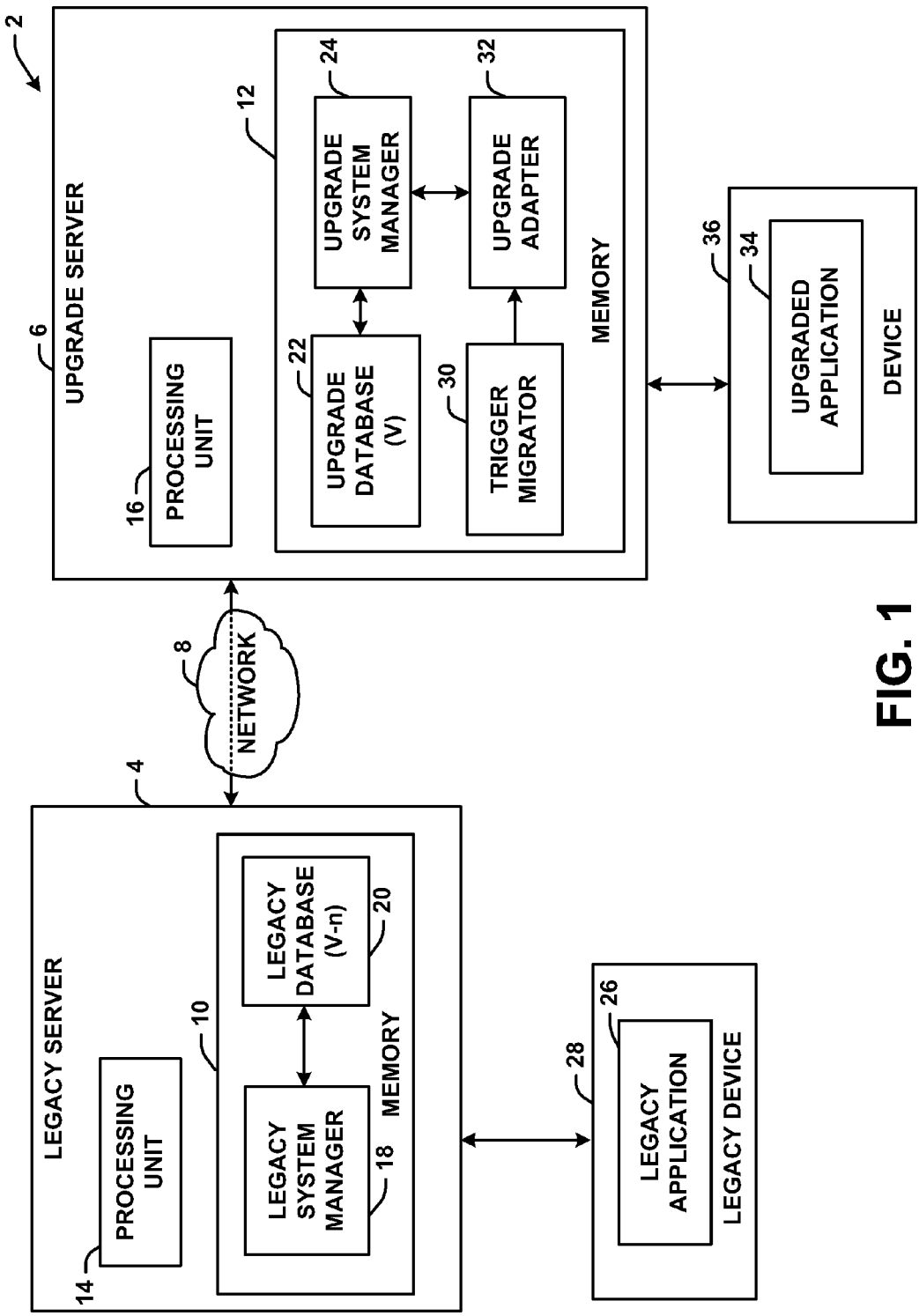
FIG. 1 illustrates an example of a system for upgrading a database.

FIG. 1 illustrates an example of a system 2 for upgrading a database. The system 2 can include a legacy server 4 and an upgrade server 6 that communicate with each other, such as over a network 8. The network 8 could be a public network (e.g., the Internet) a private network or combination thereof. In some examples, the system 2 could be implemented as a telecommunication system.

The legacy server 4 and the upgrade server 6 can be implemented, for example, as a computer. The legacy server 4 can include a memory 10 for storing machine-readable instructions. In a similar fashion, the upgrade server 6 can also include a memory 12. The memories 10 and 12 could be implemented, for example, as volatile memory (e.g., random access memory), nonvolatile memory (a hard disk drive, a solid state drive, flash memory or the like) or a combination thereof. The legacy server 4 can also include a processing unit 14 to access the memory 10 and execute the machine-readable instructions. Similarly, the upgrade server 6 can also include a processing unit 16 to access the memory 12 and execute the machine-readable instructions. The processing units 14 and 16 can be implemented, for example, as including a processor core. It is to be understood that while in the present example, the legacy server 4 and the upgrade server 6 are illustrated as being separate computer systems, in other examples, the legacy server 4 and the upgrade server 6 could be collocated on the same server. Moreover, in other examples, the legacy server 4 and the upgrade server 6 could be implemented as virtualized components (e.g., resources of a computing cloud).

The memory 10 can include a legacy system manager 18 that can be programmed to read and write data (e.g., manage data) to and from a legacy database 20 (e.g., a repository). The legacy database 20 can be stored in the memory 10 of the legacy server 4. In some examples, the legacy database 20 can be integrated with a legacy system. In other examples, the legacy database 20 could be stored externally to the legacy server 4 and/or be distributed in the legacy system.

The upgrade server 6 can include an upgrade database 22 stored in the memory 12. The upgrade database 22 can employ a different schema than the legacy database 20. As disclosed herein, it is presumed that the upgrade database 22 is a newer version (version 'V') of the legacy database 20 (version 'V-n'). This does not necessarily imply that the upgrade database was derived directly from legacy database 20, but instead that it is intended to replace each legacy database 20 (version 'V-n') as part of an upgrade process. In a distributed system, there can be more than one different version of legacy databases to be replaced. Moreover, as explained herein, data written to the legacy database 20 can be migrated to the upgrade database 22. Additionally, some, but not necessarily all, data written to the upgrade database 22 can be migrated to the legacy database 20. In the present examples, it is presumed that the upgrade database 22 initially is synchronized with the legacy database 20. This can be implemented in an offline process prior to or concurrently with the upgrade database being activated. Thus, it can be presumed that upgrade database 22 contains every data record stored in the legacy database 20 that is required to complete the upgrade process.

To facilitate continued synchronization between the legacy database 20 and the upgrade database 22, an upgrade system manager 24 can be programmed to read and write data to the upgrade database 22. For instance, in some examples, the upgrade system manager 24 can include a data application programming interface (API) and/or a database updater that can generate database update commands (e.g., write schema) in the schema employed by the upgrade database 22 (e.g., the 'V' schema). As used herein, the term "update command" can be implemented, for example, as an insert command, an update command, a delete command or a combination thereof.

The legacy system manager 18 can include, for example, a system director that can control a flow of data from a framework to the legacy database 20. In some examples, the legacy system manager 18 can also include a data API and/or a database updater that can generate update commands (e.g., write schema) for the legacy database 20 in the schema employed by the legacy database 20 (e.g., the 'V-n' schema). Further, the legacy system manager 18 of the legacy server 4 can communicate with a legacy application 26. In some examples, the legacy application 26 can be integrated with the legacy server 4. In other examples, the legacy application 26 can be executed on a legacy device 28, such that the communication between the legacy application 26 and the legacy server 4 occurs over the network 8. The legacy device 28 could be, for example, a server, a switch, an end-user telecommunication device (e.g., a smart phone, a desk phone or a video conferencing terminal) or the like. The legacy application 26 can be implemented, for example, as a data producing and receiving component that is configured to generate data for the legacy database 20. For example, in the context of a telecommunication system, the legacy application 26 can include a switch control, communication device control, an interface, voicemail service, telecommunication management service, a conference bridge service, an instant messaging service or the like.

The legacy application can include logic (e.g., intelligence) that can be employed to identify a system (e.g., the legacy system manager 18 or the update system manager) that can provide access to needed data stored in the legacy database. For example, the logic can be a generic routing layer that is collocated with the legacy application or it may be external to the legacy application. Accordingly, in one example, the legacy application 26 can provide a data request (e.g., a read request) to the legacy system manager 18. In response, the legacy system manager 18 can query the legacy database 20 to retrieve data identified in the data request. Moreover, the legacy system manager 18 can return the data identified in the data request to the legacy application 26.

Additionally, the legacy application 26 can provide data to be written and/or updated at the legacy database 20 to the legacy system manager 18. In response, the legacy system manager 18 can generate an update command in a schema employed by the legacy database 20 (e.g., the 'V-n' schema) that writes the data to the legacy database 20. In response to the update command, the legacy database 20 can store the data provided by the legacy application 26 in a given record of the legacy database 20. Moreover, a notification table of the legacy database 20 can detect that the given record of the legacy database 20 has been updated and provide a forward migration trigger to a trigger migrator 30 of the upgrade server 6. The forward migration trigger can include the data characterizing the update to the legacy database 20. For instance, the migration trigger can include and/or be associated with data characterizing a nature of the update to the legacy database 20 (e.g., insert, update and/or delete) and data for a change row and/or other indicia that characterizes a high level summary of the update to the legacy database 20. As an example, in a telecommunication system, the update to the legacy database 20 could indicate that a user has moved from a given switch to another switch and the forward migration trigger can include sufficient data that characterizes the details of the moving of the user. As used herein, the term "forward migration" means to move a copy of data that is updated (or is to be updated) at or otherwise written to the legacy database 20 to the upgrade database 22.

The trigger migrator 30 can include logic to translate the forward migration trigger provided by the legacy database 20 (e.g., a V-n trigger) into a translated forward migration trigger (e.g., a V trigger) that is in a format that is ready for processing. Such logic can include, for example, database table and/or field mappings. In other examples, the trigger migrator 30 can act as a pass-through between the legacy database and the upgrade system manager 24. This can occur, for instance, where no translation of the forward migration trigger is needed. However, for purposes of simplification of explanation, it is considered that the trigger migrator 30 provides a translated forward migration trigger in response to a forward migration trigger, whether or not a translation of the forward migration trigger is needed.

In some examples, the trigger migrator 30 can provide the translated forward migration trigger to the upgrade adapter 32. The upgrade adapter 32 can convert the information included in the translated forward migration trigger into a schema employed by the upgrade database 22 (e.g., the 'V' schema), which converted information can be referred to as a forward migration update. The conversion by the upgrade adapter 32 may be needed, for examples, in situations where data included with the forward migration trigger is beyond a scope of the trigger migrator 30. To facilitate the generation of the forward migration update, the upgrade adapter 32 can access metadata that describes the upgrade database 22. The forward migration update can be provided to the upgrade system manager 24. The upgrade system manager 24 can, in response, update the upgrade database 22 based on the forward migration update. In this manner, updates to the legacy database 20 are forward migrated to the upgrade database 22 with the appropriate schema.

In other examples, the trigger migrator 30 can provide the translated forward migration trigger to the upgrade system manager 24. The upgrade system manager 24 can convert the translated forward migration trigger into a schema employed by the upgrade database 22 (e.g., the 'V' schema), which converted command can also be referred to an update command. It is noted that the updated command can be a delete command, an update command and/or an insert command. Moreover, the upgrade system manager 24 can update the upgrade database 22 based on the update command. In this manner, updates to the legacy database 20 are forward migrated to the upgrade database 22.

Additionally, the upgrade system manager 24 can communicate with an upgraded application 34. The upgraded application 34 can be implemented in a manner similar to the legacy application 26. For instance, the upgraded application 34 can be implemented on a device 36 (e.g., computer, a switch, an end-user telecommunication device, or the like). As a result of the upgraded application, now being configured to read and write to the upgrade database 22, the device 36 can likewise be considered upgraded. Moreover, the upgraded application 34 can be implemented, for example, as a data producing and receiving component that is configured to generate and receive data for the upgrade database 22. For example, in the context of a telecommunication system, the upgraded application 34 can include a switch control program or a communication application, an interface, voicemail service, telecommunication management service, a conference bridge service, an instant messaging service or the like. In some examples, the upgraded application 34 could be employed to communicate with the legacy system manager 18 in a manner similar to the communication between the legacy system manager 18 and the legacy application 26, while in other examples, the upgraded application 34 can employ functions that are incompatible with the legacy database 20 due to changes made during the creation of the upgrade database 22.

The upgraded application 34 can include logic (e.g., intelligence) that can identify a system (e.g., the upgrade system manager 24) that can provide access to data that can be employed by the upgraded application 34. The upgraded application 34 can provide a data request to the upgrade system manager 24. In response, the upgrade system manager 24 can generate a query for the upgrade database 22 in a schema that is employed by the upgrade database 22 (e.g., the 'V' schema). In response to the query, the upgrade database 22 can provide data requested in the query to the upgrade system manager 24. The upgrade system manager 24 can return the data requested in the data request to the upgraded application 34.

Additionally, in some examples the upgraded application 34 can provide data to be written and/or updated at the upgrade database 22 to the upgrade adapter 32. In response, the upgrade adapter 32 can generate an update command in a schema employed by the upgrade database 22 (e.g., the 'V' schema) that writes/updates the data to the upgrade database 22. The update command can be provided to the upgrade system manager 24, and in response to the update command, the upgrade database 22 can store the data provided by the upgraded application 34 in a given record of the upgrade database 22. In this example, the upgrade adapter 32 can generate a reverse migration update for the legacy database 20 based on the data provided by the upgraded application 35 and based on stored metadata that describes the schema of the legacy database 20. As used herein, the term "reverse migration" means to move a copy of data that is updated (or is to be updated) at the upgrade database 22 (e.g., in response to a write request from an upgraded application) to the legacy database 20. Forward migrated data will not be reverse migrated back to the legacy database 20. Moreover, the upgrade adapter 32 can provide the reverse migration update to the legacy database 20, such that the legacy database 20 can be updated based on the reverse migration update. In this manner, the upgrade database 22 and the legacy database 20 can be synchronized. It is noted that in some instances, due to the changes in the schema between the upgrade database 22 and the legacy database 20, the adapter 32 may be unable to generate the reverse migration update. In these instances, the update to the upgrade database 22 is not reverse migrated to the legacy database 20.

In other examples, the upgrade system manager 24 can receive the data to be written and/or updated in the upgrade database 22. The upgrade system manager 24 can examine the type of the data and determine whether to provide the update of the upgrade database 22 to the legacy database 20 through an exception path. In some examples, some updates to the upgrade database 22 may not be provided to the legacy database 20. For instance, in a telecommunication system, the upgrade system manager 24 can be programmed to differentiate between personal updates (e.g., personal options) that relate to updates personal to an end user or end user device and non-personal updates, such as system or administrator level updates. For example, updates to the upgrade database 22 relating to personal options are not provided to the legacy database 20, while updates related to non-personal options can be provided to the legacy database 20 via the exception path without first writing such data to the upgrade database. As an example, if the upgraded application 34 is implemented on an end-user device, such as a telephone or a smart phone, the personal options can be related to call handling modes, privacy settings, personal directories, ring tones voicemail notification handling or the like. Conversely, non-personal options can include nearly any other type of update to the upgrade database 22. As some examples, if the upgraded application 34 is implemented on a switch, the non-personal options could include, but are not limited to a list of telephone extensions connected to the switch, an IP address associated with the switch, huntgroup schedules, telephone number assignments related to the switch or the like.

If it is determined that the update to the upgrade database 22 is not being provided to the legacy database 20 (e.g., it is a personal option), the upgrade system manager 24 can generate an update command for the upgrade database 22 based on the data received from the upgraded application 34. If it is determined that the update to the upgrade database 22 is to be provided to the legacy database 20 (e.g., a non-personal option), the upgrade system manager 24 can generate the exception path to the legacy system manager 18 that includes exception data characterizing the data provided by the upgraded application 34. The upgrade system manager 24 can provide the exception data to the legacy system via the exception path without first storing the data in the upgrade database 22. In some examples, the data provided by the upgraded application 34 can be implemented as a primary key for a database. In such a situation, exception data that includes the data provided by the upgraded application 34 can be provided by the upgrade system manager 24 of the upgrade server 6 to the legacy system manager 18 of the legacy server 4 via a legacy API for the legacy database. The exception data thus can be received by the legacy system manager 18 of the legacy server 4 via the API, and the legacy system manager 18 can generate and execute an update command for the legacy database 20 based on the exception data. In response, the legacy database 20 can generate a forward migration trigger based on the update to the legacy database 20 that can be provided to the upgrade system manager 24 and processed in a manner described herein. Thus, in these examples, the legacy database 20 can contain a proper subset of the data stored in the upgrade database 22.

The system 2 can be designed such that the upgraded application 34 and/or the legacy application 26 can be configured to be agnostic as to the schema employed by an associated database. Stated differently, the upgraded application 34 and/or the legacy application 26 can be programmed such that the source and/or destination (e.g., the legacy database 20 or the upgrade database 22) of data consumed or provided is immaterial to the configuration of the upgraded application 34 and/or the legacy application. Such a configuration can ensure that the upgraded application 34 and/or the legacy application 26 can move between domains (e.g., between databases employing the 'V' schema and the 'V-n' schema) with relative simplicity (e.g., no changes or minimal changes).

At some point in time, it can be desirable and/or necessary to retire the legacy database 20. Alternatively, it may be desirable, and/or necessary to upgrade the legacy database 20 to the schema employed in the upgrade database 22. In such a situation, applications, such as the system director implemented on the legacy system manager 18 can be migrated to the upgrade server 6. Moreover, upon such a migration of the applications, the legacy database 20 can be retired and/or migrated to the schema employed by the upgrade database 22 (e.g., the 'V' schema) immediately since the data stored in the upgrade database 22 will reflect the most recent updates to the legacy database 20. In other examples, the upgrade database 22 and an appropriate management framework can be migrated into the legacy server 4 such as in conjunction with upgrading the director system. By employment of the system 2, in an example where multiple databases are employed, each database can be upgraded individually (e.g., an incremental, rolling upgrade) while minimizing an impact on the overall system 2.

By employment of the system 2, the schema employed by the upgrade database 22 (e.g., the 'V' schema) does not have to be compatible with the schema employed by the legacy database 20 (e.g., the 'V-n' schema). Moreover, since the schemas do not need to be compatible, the complexity of the applications that utilize the legacy database 20 or the upgrade 22 can be reduced since each application would only need to include logic to interface with one type of database. Further, since the schemas do not need to be compatible, the upgrade database 22 could be implemented as a completely different type of database than the legacy database 20. For instance, the legacy database 20 could employ the MySQL schema (or some derivative thereof), while the upgrade database 22 could employ the PostgreSQL schema (or some derivative thereof), which schema are incompatible.

Furthermore, in some examples, the architecture of the system 2 can achieve a high degree of reliability since the upgrade database 22 and the legacy database 20 can be implemented on separate and independent systems. Moreover, the architecture of the system 2 can provide significant flexibility in scheduling and performing upgrades, including in the order in which system components are upgraded, to the schema employed by the upgrade database (the 'V' schema) since each of the legacy databases 20 and other components of the system 2 can be upgraded incrementally and independently. There also will continue to be at least one functioning database (e.g., the upgrade database 22 and/or the legacy database 20) during a version upgrade process phase. This allows administrators to focus efforts on upgrading one or more legacy databases and further affords an extended opportunity to work out any infrastructure (e.g., compatibility) issues and even rollback to the legacy database, if needed. Additionally, during such a migration phase, the system 2 can allow moves, adds and changes (MACS).

Further still, in some examples, the system 2 can achieve near real-time data consistency between the legacy database 20 and the upgrade database 22. That is, since updates to the legacy database 20 and the upgrade database happen at nearly the same time, the upgrade database 22 and the legacy database 20 are nearly always synchronized with each other, and the system 2 can offer a consistent system-wide view.

Further, in examples where many databases are employed in a distributed system 2, each database can be upgraded from the schema employed by the legacy database 20 (e.g., the 'V-n' schema) to the upgrade database 22 individually, such that the system 2 can continue to operate and function properly during a version migration phase. Further, in the event that errors (e.g., bugs) in the schema are discovered in the upgrade database 22, the upgrade database 22 can be rolled back to the schema employed by the legacy database 20 (e.g., the 'V-n' schema), since the upgrade database 22 contains a superset of the data stored in the legacy database 20. Further, in some examples, primary key collisions can be avoided.

Figure 2:
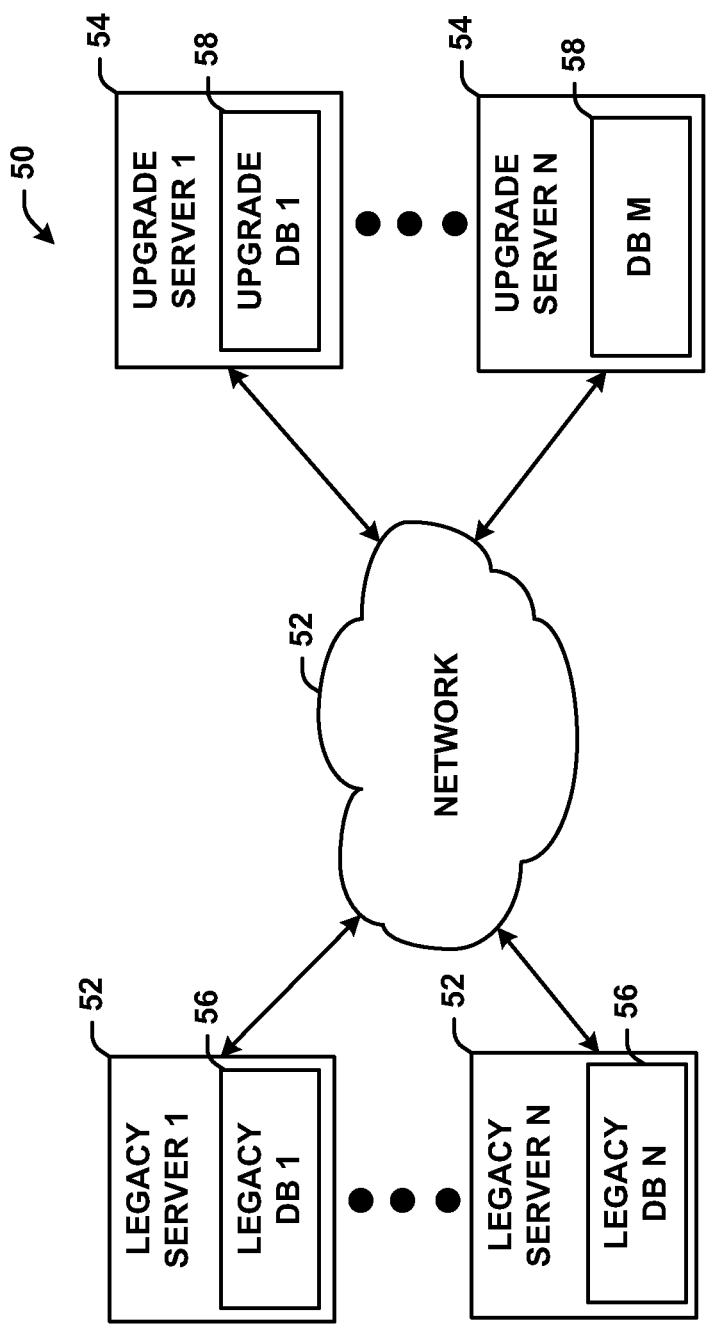
FIG. 2 illustrates an example of a system for upgrading a distributed database.

FIG. 2 illustrates an example of a system 50 for upgrading a distributed database. The system 50 can be implemented in a manner similar to the system 2 illustrated in FIG. 1. Moreover, for purposes of simplification of explanation, the same reference numbers are employed in the FIGS. 1 and 2 to denote the same structure. The system 50 can include N number of legacy servers 52 and M number of upgrade servers 54 that can communicate over a network 8, where N and M are integers greater than or equal to one. As mentioned above, the upgrade process for each legacy database can be implemented incrementally, such that each legacy database is updated independently. This can include sequential updates or, in other examples, legacy databases can be upgraded in a parallel manner (e.g., plural updates can be performed concurrently).

Each of the N number of legacy servers 52 can be implemented in a manner similar to the legacy server 4 illustrated in FIG. 1. The N number of legacy servers 52 can each include a corresponding legacy database 56. Each of the N number of legacy databases 56 can collectively form a distributed legacy database. Similarly, each of the M number of upgrade servers 54 can be implemented in a manner similar to the upgrade server 6 illustrated in FIG. 1. Each of the upgrade servers 54 can include an upgrade database 58 that can collectively form a distributed upgrade database.

Each of the 1 through N number of legacy servers can be incrementally migrated to a corresponding one of the M number of upgrade servers 54. For instance, in one example, to migrate legacy server 1, upgrade server 1 can be brought online. In such a situation, legacy database 1 can employ the V-n schema, while the upgrade database 1 can employ the V schema. Both of the legacy server 1 and the upgrade server 1 can operate concurrently during a migration phase, such as in any of the manners described with respect to FIG. 1. Moreover, at some point in time, the legacy server may be retired (e.g., shut down) as explained with respect to FIG. 1. In such a situation, each of the remaining 2–N legacy servers 52 can continue to function properly, before, during and after the migration of the legacy server 1. Moreover, each of the remaining 2–N legacy servers 52 can be incrementally migrated in a manner similar to the legacy server 1. Accordingly, each of the N number of legacy servers 52 can be migrated to the corresponding M number of upgrade servers 54 individually, thereby avoiding the need to perform a "big bang" migration that includes upgrading each of the 1–N legacy servers 52 at or near the same time. Instead, the approach disclosed herein facilitates an incremental or rolling upgrade across the distributed legacy servers in a manner that can be controlled independently of each other (e.g., by an administrator).

FIGS. 3-7 depict data workflow diagrams for examples of different methods that can be utilized for different database management scenarios, such as for synchronizing databases. In the examples of FIGS. 3-7, some data transferred between different components can be provided over a network (e.g., a public and/or a private network). While, for purposes of simplicity of explanation, the example methods of FIGS. 3-7 are shown and described as executing serially, the examples disclosed herein are not limited by the illustrated order, as some actions could in other examples occur in different orders and/or concurrently from that shown and described herein. Moreover, it is not necessary that all disclosed actions be performed to implement a method.

Figure 3:
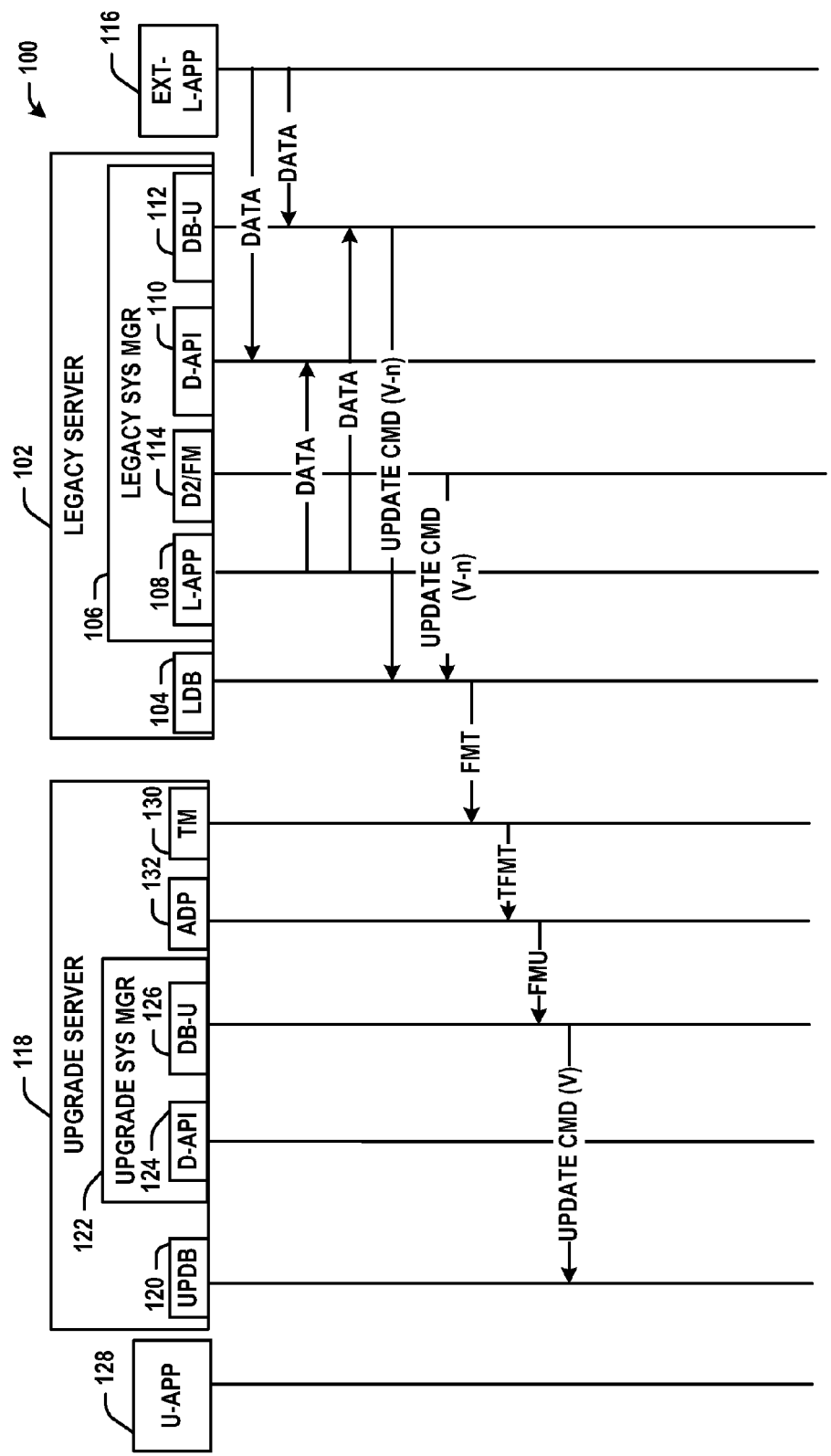
FIG. 3 illustrates an example of synchronizing an update to a legacy database with an upgrade database.
Figure 4:
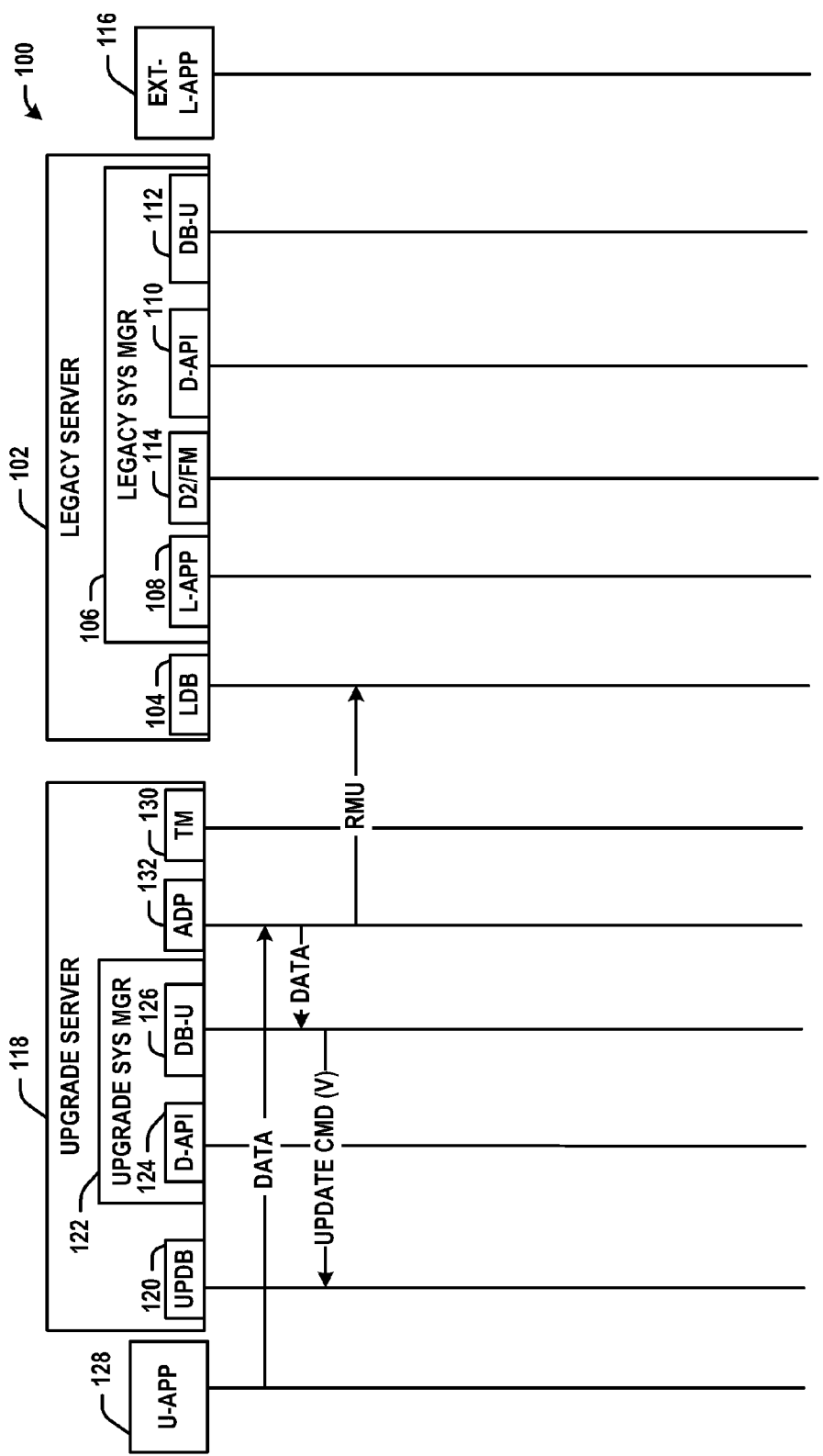
FIG. 4 illustrates an example of synchronizing an upgrade to an upgrade database with a legacy database.

In each of the examples illustrated in FIGS. 3-7, a system 100 can include a legacy server 102 (e.g., the legacy server 4 illustrated in FIG. 1). The legacy server 102 can include a legacy database (LDB) 104 and a legacy system manager 106 (LEGACY SYS MGR). The legacy system manager 106 can include, for example, a legacy application (L-APP) 108 that can be a consumer and a producer of data for in the legacy database 104. The legacy system manager 106 can also include a data API (D-API) 110 and a database updater (DB-U) 112 that can each be employed to generate an update command (e.g., write schema) for the legacy database 104. In the examples of FIGS. 3-7, for purposes of simplification of explanation, only one update command is provided in response to data being provided from the data API 110 or the database updater 112; however, it is to be understood that the either the data API 110 or the database updater 112 could provide the update command according to where the update request was issued. Further, the legacy system manager 106 can include a director 114 that can communicate data (e.g., read and write) to the legacy database 104 via a framework, such as a full stack web application framework. In FIGS. 3 and 4, the director and the framework are collectively illustrated as "D2/FM" 114. The legacy server 102 can communicate with a legacy application 116 (EXT-L-APP) that is external to the legacy server 102. The legacy application 116 external to the legacy server can be implemented in a manner similar to the legacy application 108 integrated with the legacy system manager 106.

The legacy server 102 can communicate with an upgrade server 118 (e.g., the upgrade server 6 illustrated in FIG. 1) that can include an upgrade database (UPDB) 120. The upgrade database 120 can employ a different schema (e.g., the 'V' schema) than the schema (the 'V-n' Schema) employed in the legacy database 104. The upgrade server 118 can include an upgrade system manager 122 that can be employed to implement a data API (D-API) 124 and a database updater (DB-U) 126 that can each be employed to read and write data to the updated database. As mentioned above, for purposes of simplification of explanation, only one update command is provided in response to data being provided from the data API 124 or the database updater 126, but it is to be understood that the either the data API 124 or the database updater 126 could provide the update command depending on which one received the update request. The upgrade server 118 can be configured to communicate with an upgraded application (U-APP) 128. The upgraded application 128 can consume and provide data to/from the upgrade database 120. The upgrade server 118 can also include a trigger migrator 130 to receive and provide translated forward migration triggers. The trigger migrator 130 can include logic to translate update requests in the 'V-n' schema into the 'V' schema. For instance, in some examples, the trigger migrator 130 can include logic to translate the forward migration trigger provided by the legacy database (e.g., a V-n trigger) into a translated forward migration trigger (e.g., a V trigger) that is in a format that is ready for processing. Additionally, in some examples (e.g., FIG. 3) an adapter 132 can be employed to convert data into update commands (e.g., write schema) for the upgrade database 120 and the legacy database 104.

It is noted that in the examples illustrated in FIGS. 3-7, although only legacy database 104 and one upgrade database 120 are shown and described, in other examples, the system 100 could be implemented with a distributed legacy database and/or a distributed upgraded database in manner shown and described with respect to FIG. 2. In such a situation, updates to one upgrade database of a distributed upgrade database can be synchronized with some or all other upgrade databases of the distributed upgrade database. Similarly, updates to one legacy database of a distributed legacy database can be synchronized with some or all other legacy databases of the distributed legacy database.

In the example illustrated in FIG. 3, data (DATA) can be generated from the legacy application 116 external to the legacy server or the legacy application 108 integrated in the legacy server 102. Moreover, the data can be provided to the data API 110 of the legacy system manager 106 and/or the database updater 112 of the legacy system manager 106. In response, the database updater 112 can generate an update command (UPDATE CMD (V-n)) in a schema employed by the legacy database 104 (e.g., the 'V-n' schema). As noted, the update command could be, for example, an insert, update, a delete command or a combination thereof. While, in the example of FIG. 3, only one update command is illustrated in response to multiple data signals, in other examples, a different update command can be provided for each different instance of data being provided to the data API 110 and/or the database updater 112. Additionally or alternatively, the director 114 can provide an update command to the legacy database 104 via the framework.

In response to the update command from the framework or the database updater 112, the legacy database 104 can provide a forward migration trigger (FMT) to the trigger migrator 130 of the upgrade server 118. The forward migration trigger can include data characterizing the update to the legacy database 104. For instance, the forward migration trigger can include data characterizing a nature of the update to the legacy database 104 (e.g., insert, update and/or delete) and data for a change row and/or other indicia that characterizes a high level summary of the update to the legacy database 104. For instance, in a telecommunication system, the update to the legacy database 104 could indicate that a user has moved from a given switch to another switch and the forward migration trigger can include sufficient data that characterizes the details of the moving of the user. The trigger migrator 130 of the upgrade server 118 can translate the forward migration trigger into a translated forward migration trigger (TFMT) that can be provided to the adapter 132.

The adapter 132 can convert the information included in the forward migration trigger into a schema employed by the upgrade database 120 (e.g., the 'V' schema), which converted command can be referred to as a forward migration update (FMU). To facilitate the generation of the forward migration update, the adapter 132 can access metadata that describes the upgrade database 120. The adapter 132 can provide the forward migration update to the database updater 126. In response, the database updater 126 can generate and execute an update command (e.g., a write schema) on the updated database, thereby synchronizing the update to the legacy database 104 with the upgrade database 120.

In FIG. 4, data (DATA) can be provided from an upgraded application 128 to the adapter 132. In response, the adapter 132 can forward the data to the database updater 126. The database updater 126 can execute an update command (e.g., a write request) on the updated database based on data forwarded by the adapter 132. Additionally, the adapter 132 can generate a reverse migration update (RMU) that includes an update command (e.g., a write schema) for the legacy database 104 that is also based on the data provided from the upgraded application 128. To generate the reverse migration update, the adapter 132 can employ metadata that characterizes the schema employed by the legacy database 104 (e.g., the 'V-n' schema). In response to the reverse migration update, the legacy database 104 can be updated. In some examples, the adapter 132 may not provide the reverse migration update if it is determined that the data provided from the upgraded application 128 is not compatible with the legacy database 104. For instance, the adapter 132 may not provide the reverse migration update if an update command for the data provided by the application cannot be properly characterized by the schema employed by the legacy database 104 (e.g., the 'V-n' schema).

By employment of the method illustrated in FIGS. 3 and 4, the database schema employed by the upgrade database 120 (e.g., the 'V' schema) does not need to be compatible with the schema employed by the legacy database 104 (e.g., the 'V-n' schema). Moreover, since the schemas do not need to be compatible, complexity of the applications that utilize the legacy database 104 or the upgrade 120 can be reduced since each application would only need to include logic to interface with one type of database. Further, since the schemas do not need to be compatible, the upgrade database 120 could be implemented as a completely different type of database than the legacy database 104.

Furthermore, in some examples, the architecture of the system can achieve a high degree of reliability since the upgrade database 120 and the legacy database 104 are implemented on separate systems and can operate independently. As a result, the architecture can provide significant flexibility in scheduling and performing upgrades to the schema employed by the upgrade database (the 'V' schema) since the databases and components of the system can be upgraded incrementally since there will continue to be at least one functioning database (e.g., the upgrade database 120 and/or the legacy database 104) during a version migration phase. The flexibility also extends to the order in which system components are upgraded. Additionally, during such a migration phase, the system can allow move, adds and changes (MACS) with little to no modifications to account for the migration phase.

Further still, in some examples, the system can achieve near real-time data consistency between the legacy database 104 and the upgrade database 120. That is, since updates to the legacy database 104 and the upgrade database 120 happen at nearly the same time, the upgrade database 120 and the legacy database 104 are nearly always synchronized with each other, and the system can offer a consistent system-wide view.

Moreover, since applications have both the upgrade database 120 and the legacy database 104 available, database read commands do not all have to be in the schema employed by the legacy database 104 (e.g., the 'V-n' schema). Further, in the event that a rollback of the upgrade database 120 is needed, the rollback would be relatively simple, since the legacy database 120 would contain at least all of the data contained in the upgrade database 104.

Figure 5:
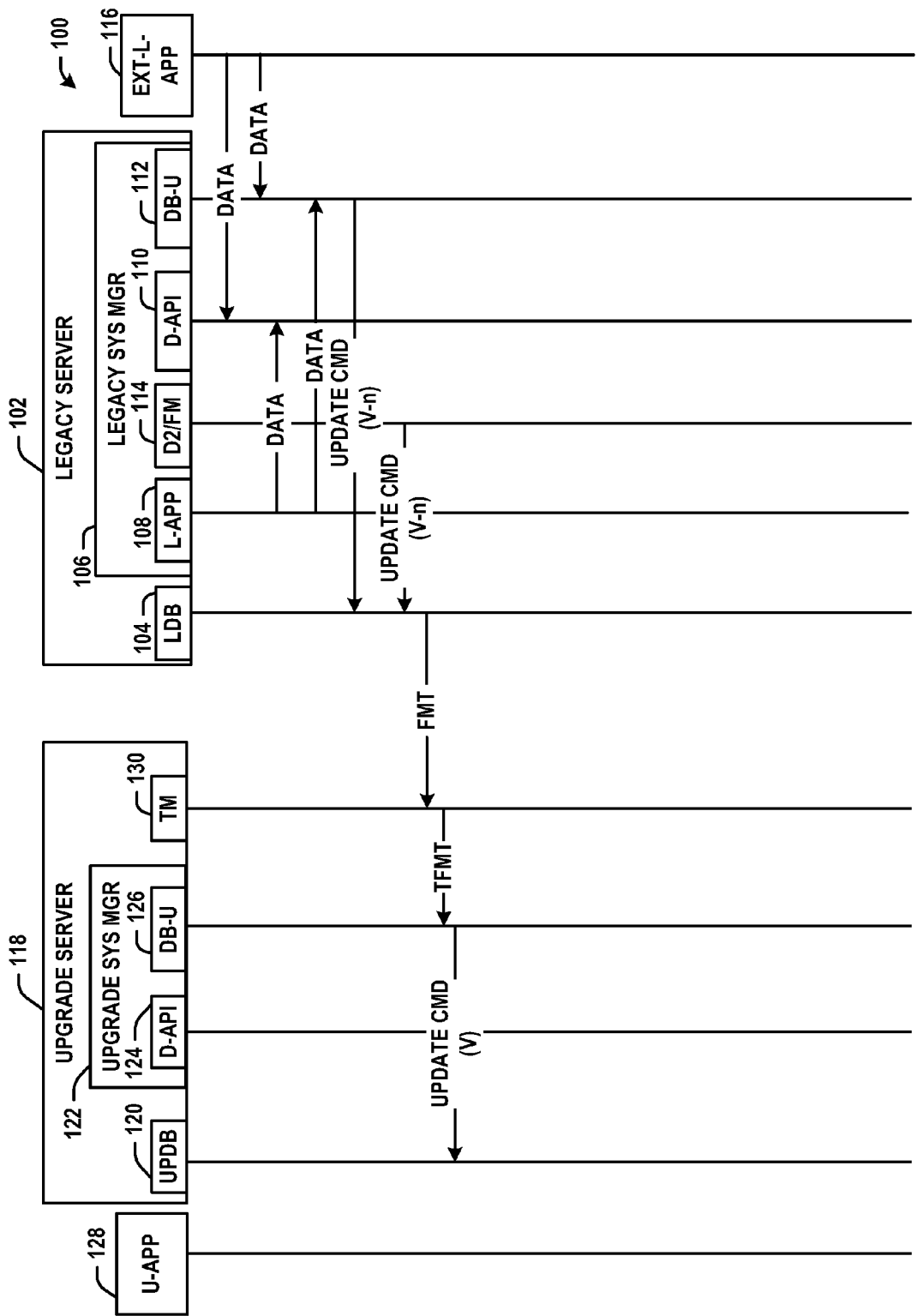
FIG. 5 illustrates another example of synchronizing an update to a legacy database with an upgrade database.
Figure 6:
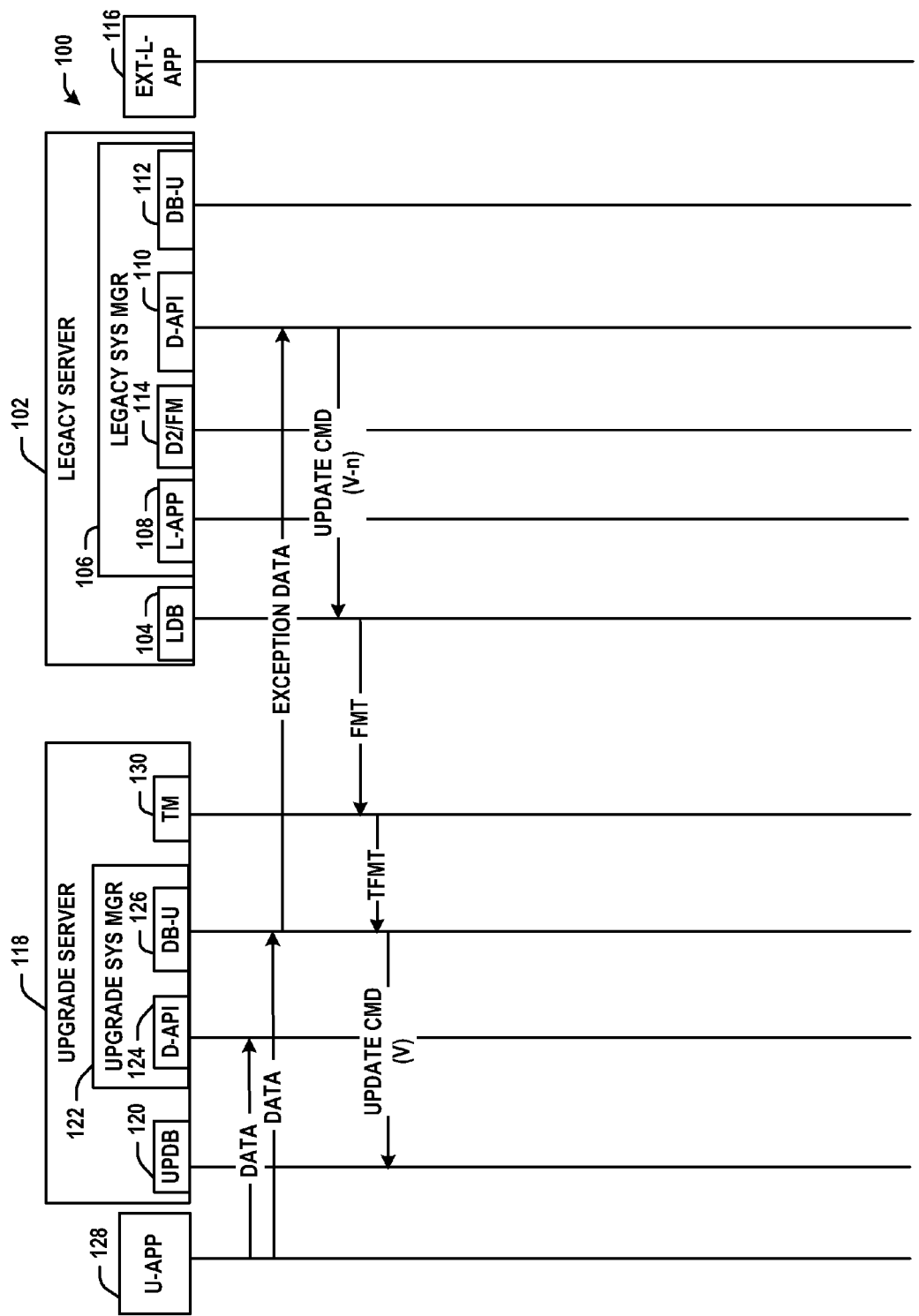
FIG. 6 illustrates another example of synchronizing an update to an upgrade database with a legacy database.
Figure 7:
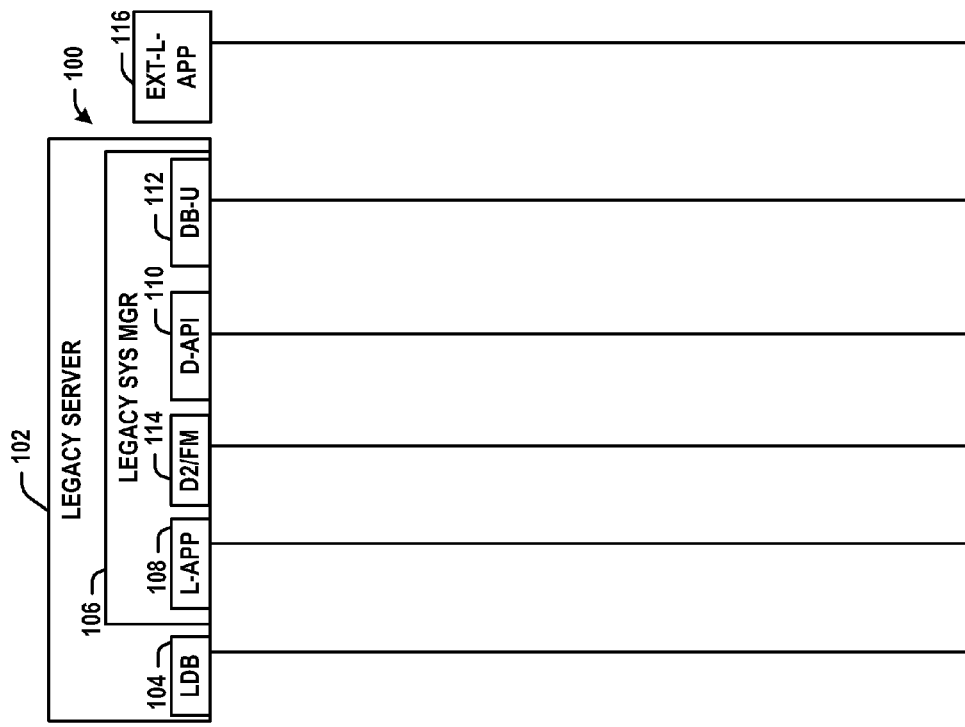
FIG. 7 illustrates an example of updating an upgrade database without synchronizing the update with a legacy database.
Figure 7:
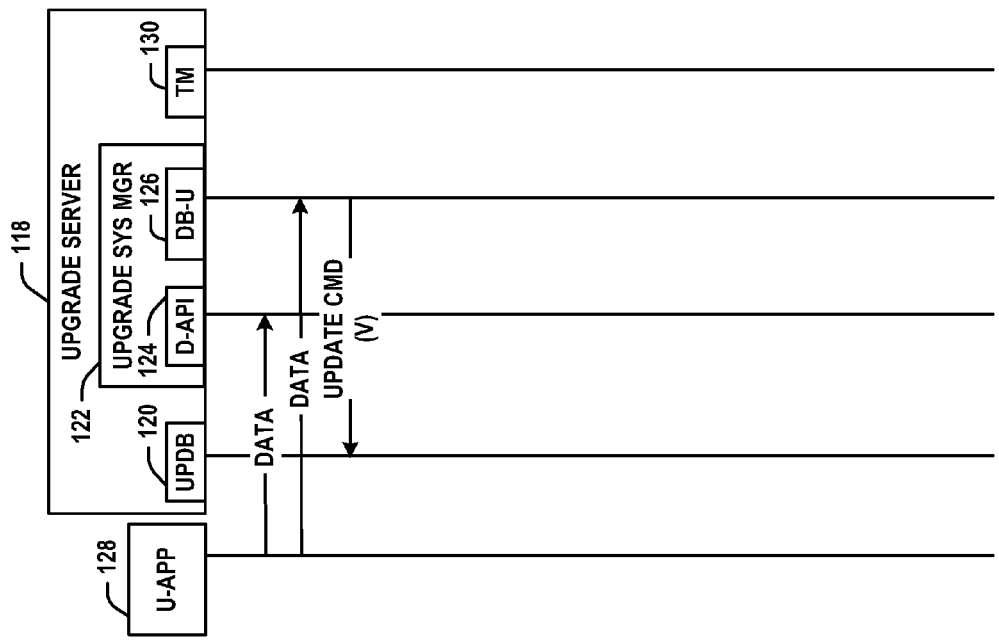

FIGS. 5-7 illustrate example embodiments of an upgrade management system where the adapter 132 of FIGS. 3-4 is not needed and therefore omitted from the upgrade server 118. For example, in FIG. 5, the legacy application 116 external to the legacy server 102 and the application integrated with the legacy system manager 106 can provide data (DATA) to the data API 110 and/or the database updater 112 of the legacy system manager 106. In response, the database updater 112 can generate an update command (UPDATE CMD (V-n)) in a schema employed by the legacy database 104 (e.g., the 'V-n' schema). As noted, the update command could be, for example, an insert, update, a delete command or a combination thereof. In a similar manner, the director 114 can request an update to the legacy database 104, which request can be employed by the framework to generate an update command (UPDATE CMD (V-n)) in the schema employed by the legacy database 104 (e.g., the 'V-n' schema).

In response to an update command (e.g., a write schema), the legacy database 104 can be updated. Moreover, the legacy database 104 provide a forward migration trigger (FMT) to the trigger migrator 130 of the upgrade server 118, wherein the forward migration trigger can include data characterizing the update to the legacy database 104. For instance, the data in the forward migration trigger can characterize a nature of the update to the legacy database 104 and data for a changed row or some other high level summary of the change (e.g., a user moving from a given switch to another switch). The trigger migrator 130 can translate the forward migration trigger into a translated forward migration trigger (TFMT). The translated forward migration trigger can be provided to the database updater 126 of the upgrade system manager 122. In response to the translated forward migration trigger the database updater 126 can generate an update command (e.g., UPDATE CMD (V)) in a schema employed by the upgrade database 120 (e.g., the 'V' schema). As noted, the update command can be implemented, as an insert command, an update command, a delete command or a combination thereof.

In FIG. 6, the upgraded application 128 can provide data (DATA) to be stored in the upgrade database 120 to the data API 124 and/or the database updater 126 of the upgrade system manager 122. In response, the database updater 126 can examine the data provided by the application and determine whether the data should be provided to the legacy database 104. In the example of FIG. 7, if the nature of the update is related to a given type of update, the data would not be provided to the legacy database 104, while if the nature of the data is related to a different type of update, the data is provided to the legacy database via an exception path. For instance, in a telecommunication system, if the data provided from the upgraded is related to non-personal options (e.g., phone settings, hunt group schedules, telephone switch assignments, or the like), the database updater 126 can determine that the data provided from the upgrade database 120 should be provided to the legacy database 104. In such a situation, the database updater 126 can generate exception data that includes the data provided from the upgraded application 128. The exception data can be provided to the data API 110 of the legacy system manager 106 via the exception path. In response, the data API 110 can generate and execute an update command (UPDATE CMD (V-n)) with the schema employed by the legacy database 104 (e.g., the 'V-n' schema). As noted, the update command can be implemented, as an insert command, an update command, a delete command or a combination thereof.

Upon updating the legacy database 104, the legacy database 104 can generate a forward migration trigger (FMT) that can be provided to the trigger migrator 130 of the upgrade server 118. The trigger migrator 130 can translate the forward migration trigger into a translated forward migration trigger (TFMT), which can be in a format for further processing. The trigger migrator 130 can provide the translated forward migration trigger to the database updater 126 of the upgrade system manager 122. In response, the database updater 126 can generate and execute an update command (UPDATE CMD (V)) on the upgrade database 120 in the schema employed by the upgrade database 120 (e.g., the 'V' schema). As noted, the update command can be implemented, as an insert command, an update command, a delete command or a combination thereof. The exception path can provide a mechanism for routing an update from the upgrade server 118 to the legacy server 102 via the legacy API 110 for updating the legacy database 104, which updates are then forward migrated back to the upgrade database 120 where the update process originated, as disclosed herein. In this manner, updates to data related to the different type can be synchronized between the upgrade database 120 and the legacy database 104.

In FIG. 7, data can be provided from the upgraded application 128 (DATA) to the data API 124, and/or the database updater 126 of the upgrade system manager 122 that can be related to the given type. In some examples, such as telecommunications system, the given type of data can be personal options (user change mode updates, user mailbox settings, call handling or the like) for a telephone (e.g., a smart phone, a desk phone or the like). In such a situation, the database updater 126 can determine that the data provided from the upgraded application 128 is not to be provided to the legacy database 104. Thus, the database updater 126 can generate and execute an update command (UPDATE CMD (V)) on the upgrade database 120. As noted, the update command can be implemented, as an insert command, an update command, a delete command or a combination thereof. In this example, the data provided by the upgraded application 128 is provided to the legacy database 104. Thus, the upgrade database 120 can have a proper superset of data in the legacy database 104.

By employment of the system illustrated in FIGS. 5-7, the database schema of the upgrade database 120 does not have to be compatible with the database schema employed by the legacy database 104 (e.g., the 'V-n' schema), since applications have both the upgrade database 120 and the legacy database 104 available. Moreover, since the schemas do not need to be compatible, complexity of the applications that utilize the legacy database 104 or the upgrade 120 can be reduced since each application would only need to include logic to interface with one type of database. Further, since the schemas do not need to be compatible, the upgrade database 120 could be implemented as a completely different type of database than the legacy database 104.

Furthermore, in some examples, the architecture of the system can achieve a high degree of reliability since the upgrade database 120 and the legacy database 104 are implemented on separate systems. Moreover, the architecture can provide significant flexibility in scheduling and performing upgrades to the schema employed by the upgrade database (the 'V' schema) since components of the system can be upgraded incrementally since there will continue to be at least one functioning database (e.g., the upgrade database 120 and/or the legacy database 104) during a version migration phase. The flexibly afforded by this architecture further extends to the order in which system components are upgraded. Additionally, during such a migration phase, the system can allow move, adds and changes (MACS) with little to no changes to account for the migration phase.

Further still, in some examples, the system can achieve near real-time data consistency between the legacy database 104 and the upgrade database 120. That is, since updates to the legacy database 104 and the upgrade database 120 happen at nearly the same time, the upgrade database 120 and the legacy database 104 are nearly always synchronized with each other, the system can offer a consistent system-wide view.

Moreover, since both database versions are employed and the upgrade database 120 and the legacy database 104 are synchronized for all data except the given data type, rollback is relatively simple. Further, in contrast to the example illustrated in FIGS. 3-4, no reverse migration path is needed, thereby further reducing complexity. Moreover, in FIGS. 5-7, the chances of primary key collisions are reduced and/or eliminated since the legacy database 104 is updated before the upgrade database 120 in examples where the legacy database 104 is updated.

Figure 8:
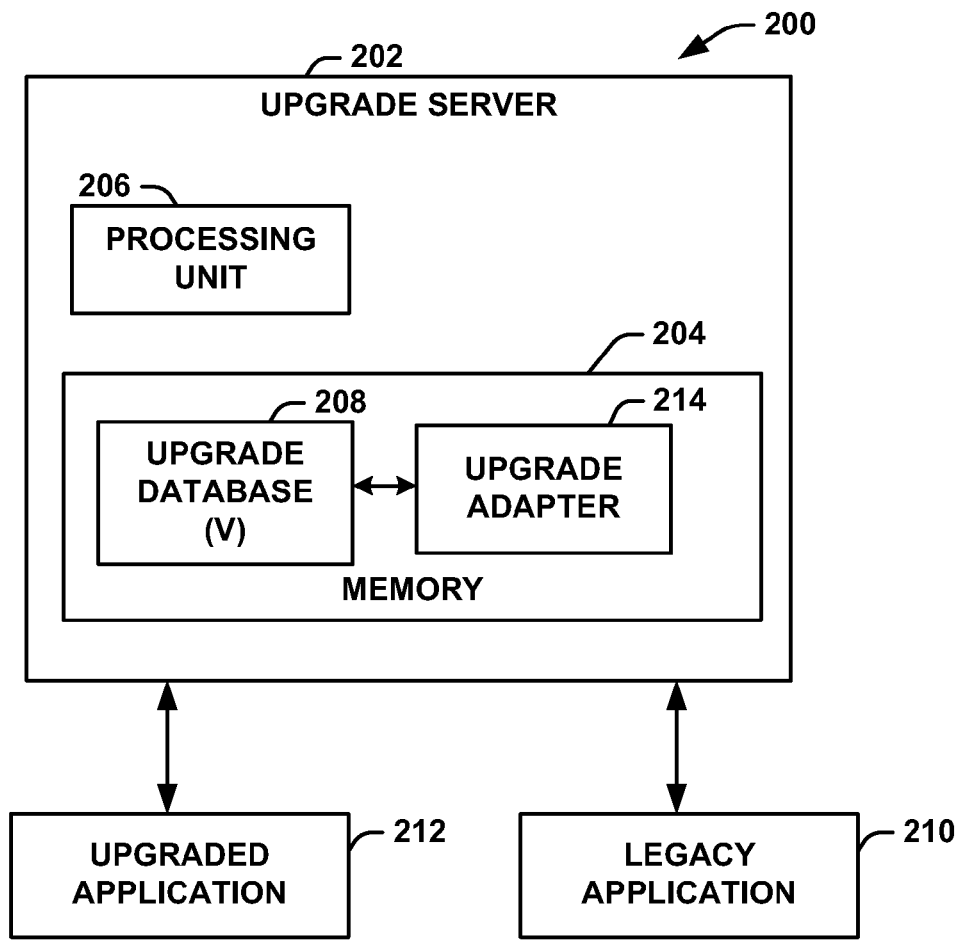
FIG. 8 illustrates another example of a system for upgrading a database.

FIG. 8 illustrates another example of a system 200 for upgrading a database. The system 200 can include an upgrade server 202 with a memory 204 (e.g., a non-transitory memory). The memory 204 can store machine readable instructions. Moreover, the upgrade server 202 can include a processing unit 206 (e.g., a processor core) that can access the memory 204 and execute the machine-readable instructions.

The memory 204 can include an upgrade database 208 that can employ a schema (e.g., the 'V' schema). The upgrade database 208 can be implemented, for example, as a legacy database that has been generated based on (or converted from) a legacy database that employed a different schema (e.g., the 'V-n' schema). The upgrade server 202 can communicate with a legacy application 210 that was configured to previously communicate with the legacy database, and the upgraded application 212 that is configured to communicate with the upgrade database 208.

The upgraded application 212 in the legacy application 210 can be implemented, for example, as data consumer and producing objects. For instance, in a telecommunication system 200, the upgraded application 212 or the legacy application 210 could be implemented on a switch, a computer (e.g., a server or personal computer) or an end-user device (e.g., a smart phone or a desk phone).

The legacy application 210 can provide data requests to the upgrade database 208 to read data. The data requests can be sent in the schema employed by the legacy database (e.g., the 'V-n' schema). The upgrade database 208 can be configured to provide the legacy application 210 with the data that is requested in the data request. In a similar manner, the upgraded application 212 can provide a data request to the upgrade database 208 to read data, wherein the data request from the upgraded application 212 can be provided in the schema employed by the upgrade database 208 (e.g., the 'V' schema). Moreover, the upgrade database 208 can be configured to respond to the data request provided from the upgraded application 212 with the data identified in the data request. In this manner, the upgraded application 212 and the legacy application 210 can request that data be read from the upgrade database 208 without a change to the data request.

In some examples, the upgraded application 212 or the legacy application 210 can provide data that is to be written to the upgrade database 208. In the example where the legacy application 210 provides data to be written to the upgrade database 208, an upgrade adapter 214 stored in memory 204 can detect the data provided from the legacy application 210, and generate an update command (e.g., a write schema) in the schema employed by the upgrade database 208 (e.g., the 'V' schema). To generate the update command, the upgrade adapter 214 can include update logic for the schema employed by the legacy database (e.g., the 'V-n' schema) and migration logic for the schema employed by the upgrade server 202 (e.g., the 'V' schema). The update command can be executed on the upgrade database 208. In a similar manner, the upgraded application 212 can provide data to be written to the upgrade database 208. In response to detecting the data provided by the upgraded application 212, the upgrade adapter 214 can generate another update command that employs the schema employed by the upgrade database 208 (e.g., the 'V' schema). The example system 200 can allow for incremental upgrading in a distributed database system. Moreover, the upgrade adapter 214 can include reverse migration scripts to downgrade the upgrade database 208 to the schema employed by the legacy database (e.g., the 'V-n' schema).

Figure 9:
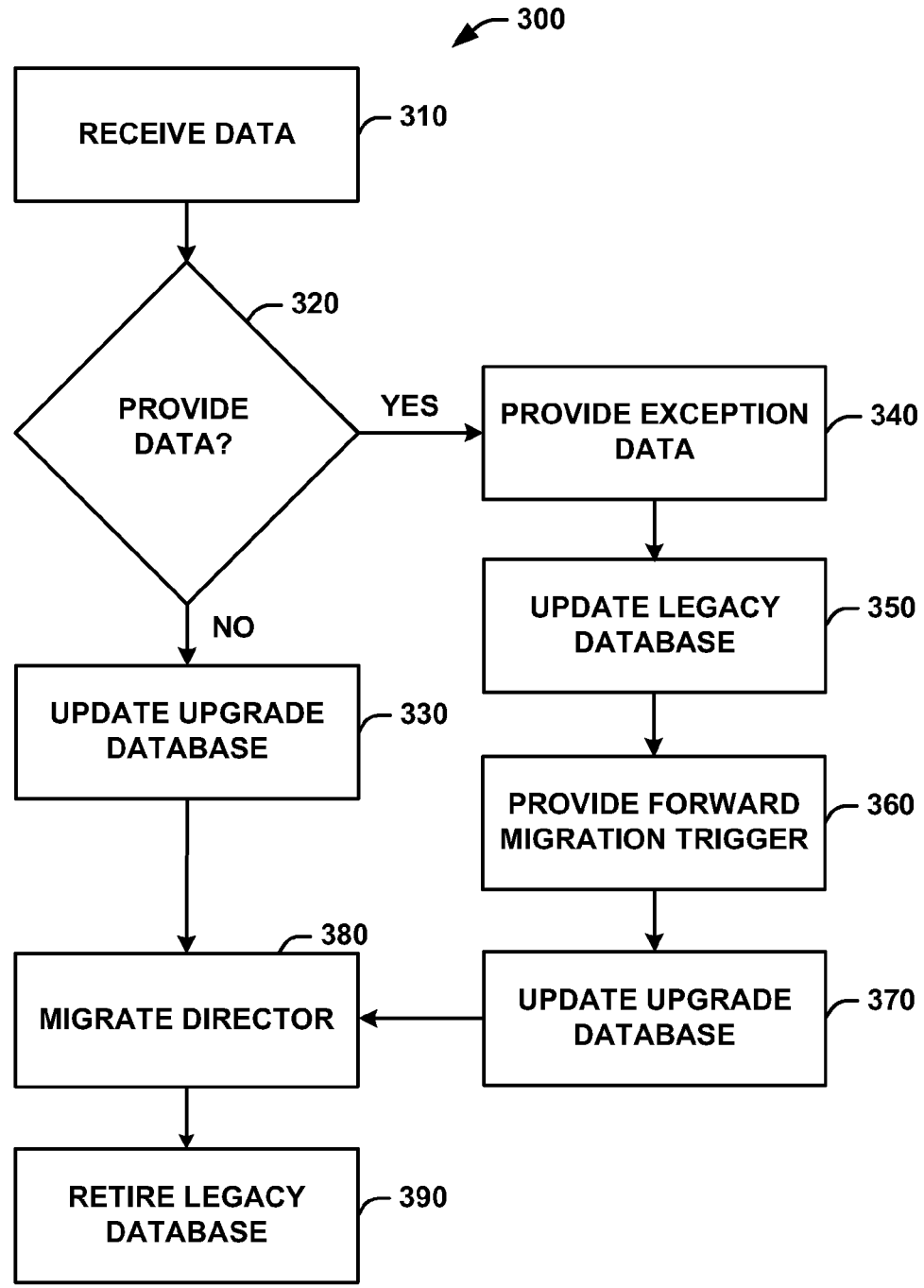
FIG. 9 illustrates a flowchart of an example method for upgrading a database.

FIG. 9 is a flowchart of an example method 300 for upgrading a database. The method can be implemented, for example, by a system that includes an upgrade database (e.g. the upgrade database 22 illustrated in FIG. 1) executing on an upgrade server. At 310, an upgrade system manager (e.g., the upgrade system manager 24 illustrated in FIG. 1) can receive data from an upgraded application (e.g., the upgraded application 34 illustrated in FIG. 1). At 320, a determination can be made by the system manager as to whether to provide the data received from the upgraded application to the legacy database. The determination can be based on the type of data received from the upgraded application. For instance, if the data is a given type of data (e.g., personal configuration settings in a telecommunication system), the determination can be negative (e.g., NO), such that the method proceeds to 330. At 330, the upgrade system manager can update the upgrade database by generating and executing an update command compatible with a schema employed by the upgrade database (e.g., the 'V' schema) based on the data received from the upgraded application. If the data is a different type of data (e.g., system level or administrative configuration settings), the determination can be positive (e.g., YES), such that the method proceeds to 340.

At 340, the upgrade system manager can provide exception data to a legacy system manager (e.g., the legacy system manager 18 of FIG. 1) of the legacy server. At 350, the legacy system manager can update the legacy database based on the exception data. To update the legacy database, the legacy system manager can generate and execute an update command in a schema employed by the legacy database (e.g., the 'V-n' schema). At 360, the legacy database can provide a forward migration trigger to the upgrade system manager via a trigger migrator (e.g., the trigger migrator 30 of FIG. 1) of the upgrade server. At 370, the upgrade system manager can update the upgrade database based on the forward migration trigger by generating and executing an update command in the schema employed by the upgrade database (e.g., the 'V' schema).

At 380, a director or other management interface executing on the legacy server (e.g., the director 114 illustrated in FIGS. 3-7) can be migrated to the upgrade server from the legacy server. In some examples, additional components such as a framework to facilitate execution of the framework can also be migrated. At 390, the legacy database can be retired since the upgrade database can contain a superset of the data stored at the legacy database.

Figure 10:
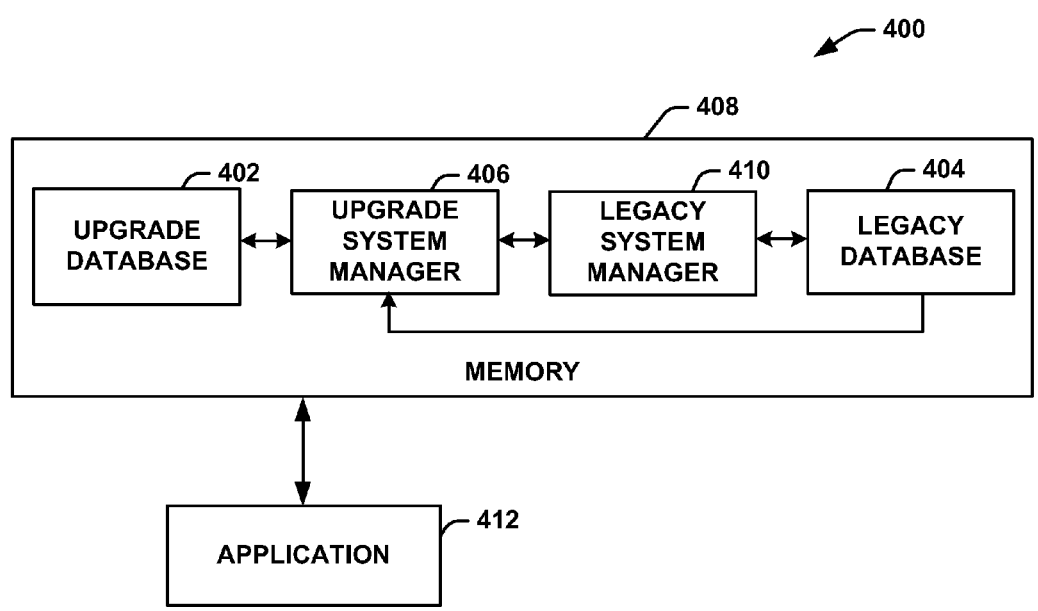
FIG. 10 illustrates yet another example of a system for upgrading a database.

FIG. 10 illustrates an example of a system 400 for managing an upgrade database 402 and a legacy database 404. The system 400 can comprise an upgrade system manager 406 stored in a memory 408. For example, the memory 408 can be implemented as a non-transitory computer readable medium (e.g., RAM, flash memory, a hard drive, or the like). Moreover, the memory 408 can span multiple distributed systems (e.g., connected over a network). The upgrade system manager 406 can be configured to communicate with the upgrade database 402 that employs a given schema. The system 400 can also comprise a legacy system manager 410 stored in the memory 408. The legacy system manager 410 can be configured to communicate with the legacy database 404 that employs another schema, wherein the legacy database 404 contains a subset of the data stored at the upgrade database 402. The legacy database 404 can be configured to provide a forward migration trigger to the upgrade system manager 406 in response to detecting an update to the legacy database 404. The upgrade system manager 406 can be further configured to determine whether data received from an application 412 configured to produce data for the upgrade database 402 is to be provided to the legacy database 404.

Figure 11:
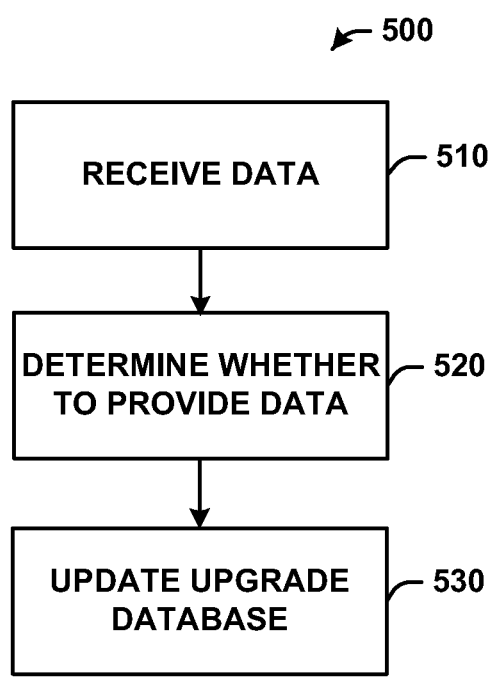
FIG. 11 illustrates another flowchart of an example method for upgrading a database.

FIG. 11 illustrates another example of a method 500. At 510, data from an application (e.g., the upgraded application 34 of FIG. 1) can be received (e.g., by the upgrade system manager 24 of FIG. 1). At 520, a determination (e.g., by the upgrade system manager 24 of FIG. 1) can be made as to whether to provide the data to a legacy database, the determination being based on a type of the data. At 530, an upgrade database (e.g., the upgrade database 22 illustrated in FIG. 1) that employs a given schema can be updated based on the data received from the application. The upgrade database can contain a superset of data stored at the legacy database that employs another schema.

Figure 12:
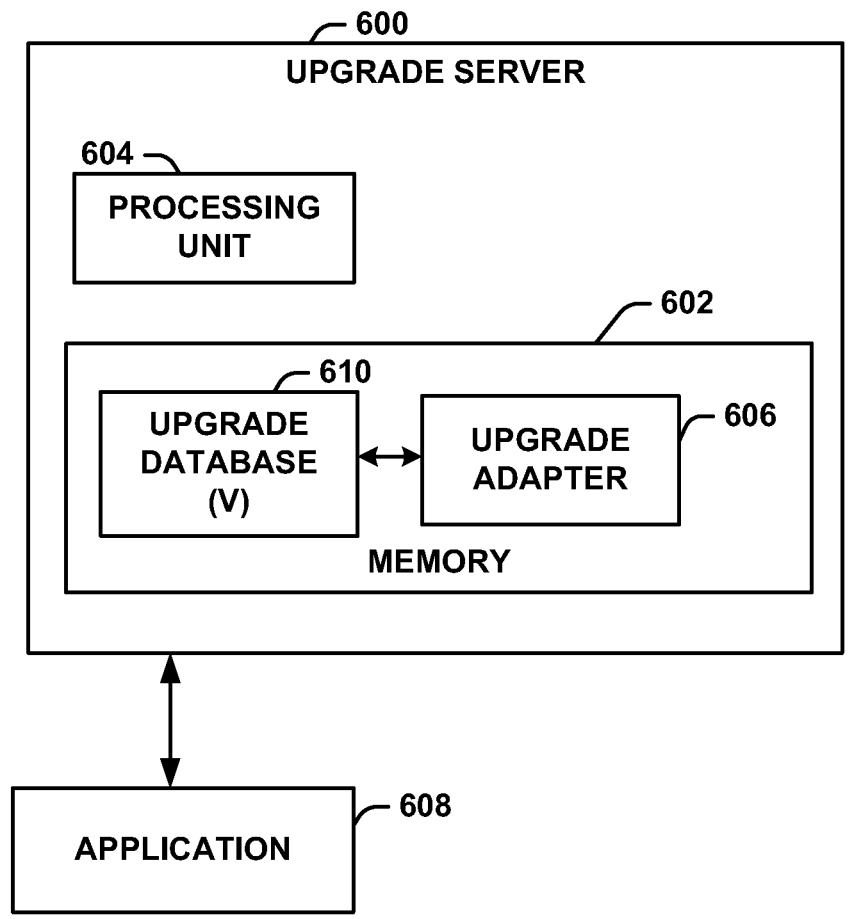
FIG. 12 illustrates yet another example of a system for upgrading a database.

FIG. 12 illustrates an example of a system 600 for upgrading a database. The system 600 can comprise a memory 602 configured to store machine readable instructions. The system 600 can also include a processing unit 604 (e.g., a processor core) to access the memory 602 and execute the machine readable instructions. The machine readable instructions can comprise an upgrade adapter 606 configured to detect data being provided from an application 608 for a legacy database that employs a given schema. The upgrade adapter 606 can also provide an update command in response to the data provided from the application 608 to an upgrade database 610 that employs another schema. The upgrade database 610 can include a complete set of data stored on the legacy database.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes"

means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
a server comprising:
one or more non-transitory memory to store machine-readable instructions; and
one or more processors to access the memory and execute the machine-readable instructions;
wherein the machine-readable instructions comprise:
an upgrade system manager, configured to communicate with an upgrade database that employs a given schema; and
a legacy system manager configured to communicate with a legacy database that employs another schema, wherein the legacy database contains a subset of the data stored at the upgrade database;
wherein the legacy database is configured to provide a forward migration trigger to the upgrade system manager in response to detecting an update to the legacy database;
wherein the upgrade system manager is further configured to determine whether data, received from an application configured to produce data for the upgrade database, is to be provided to the legacy database based on a type of data received from the application, wherein the upgrade system manager is configured not to provide the data received from the application to the legacy system manager if the data is a given type of data and to provide the data received from the application to the legacy system manager if the data is another type of data; and
wherein the data received from the application is written to the upgrade database and to the legacy database in response to the providing of the data received from the database to the legacy database.

2. The system of claim 1, wherein the given type of data is personal to an end-user or device in a telecommunication system, and the another type of data is not personal to an end-user or device in the telecommunication system.

3. The system of claim 1, wherein in response to determining that the data received from the application is the another type of data, the upgrade system manager being further configured to provide exception data to the legacy system manager via an exception path, the exception data that includes the data received from the application.

4. The system of claim 3, wherein in response to receiving the exception data, the legacy system manager is configured to update the legacy database by executing an update command that employs the another schema.

5. The system of claim 4, wherein, in response to the updating of the legacy database based on the exception data, the legacy database is configured to provide the forward migration trigger with data characterizing the update to the legacy database, and the upgrade system manager is further configured to update the upgrade database based on the forward migration trigger and the data characterizing the update to the legacy database.

6. The system of claim 1, wherein in response to determining that the data received from the application is the given type of data, the upgrade system manager being further configured to update the upgrade database based on the data provided by the application, such that the upgrade database has a proper superset of the data stored in the legacy database.

7. The system of claim 1, wherein the determination is based on a type of update command needed to update the upgrade server based on the data received from the application.

8. The system of claim 7, wherein the data received from the application is not reverse migrated if an update command for the legacy database characterizing the data received from the application cannot be characterized with the another schema.

9. The system of claim 8, wherein the upgrade system manager is further configured to update the upgrade server based on the data received from the application by employing the given schema, and wherein the upgrade database contains a proper superset of the data stored in the legacy database.

10. The system of claim 1, wherein the upgrade system manager is further configured to update the upgrade server based on the data received from the application by employing the given schema.

11. The system of claim 10, further comprising an adapter that stores data characterizing the another schema, the adapter being configured to provide a reverse migration update to the legacy database that characterizes the update of the upgrade database, wherein the reverse migration update employs the another schema.

12. The system of claim 1,
wherein the legacy database is one of a plurality of legacy databases distributed across an enterprise; and
wherein each of the plurality of legacy databases operates independently of each other.

13. The system of claim 12,
wherein the upgrade database is one of a plurality of upgrade databases distributed across the enterprise;
wherein each of the plurality of upgrade databases operates independently of each other; and
wherein each upgrade database in the plurality of upgrade databases stores a superset of the data stored at a corresponding one of the plurality of legacy databases.

14. The system of claim 1, wherein the application is a given application, the given application comprising logic configured to identify the upgrade system manager as a provider of access to data employed by the given application, the system further comprising another application comprising logic configured to identify the upgrade system manager or the legacy system manager as a provider of access to data employed by the another application.

15. The system of claim 1, wherein the application is configured to consume data provided from the legacy database and the upgrade database.

16. The system of claim 1, wherein the update to the legacy database causes a corresponding update to the upgrade database to maintain near real-time consistency between the legacy database and the upgrade database.

17. The system of claim 1, wherein the legacy database and the upgrade database operate independently of each other, such that a shutdown of a given one of the upgrade database and the legacy database functions independently of operation of the other of the upgrade database and the legacy database.

18. The system of claim 1, wherein the given schema and the another schema are incompatible with each other.

19. The system of claim 1, wherein the legacy database and the upgrade database are online concurrently.

20. A system comprising:
a server comprising:
one or more non-transitory memory to store machine-readable instructions; and one or more processors to access the memory and execute the machine-readable instructions;

wherein the machine-readable instructions comprise:

an upgrade system manager, configured to communicate with an upgrade database that employs a given schema; and a legacy system manager configured to communicate with a legacy database that employs another schema, wherein the legacy database contains a subset of the data stored at the upgrade database, wherein the legacy database is configured to provide a forward migration trigger to the upgrade system manager in response to detecting an update to the legacy database;

wherein the forward migration trigger characterizes the update to the legacy database;

a trigger migrator configured to generate a translated forward migration trigger based on the forward migration trigger, the translated forward migration trigger being in a format associated with the upgrade system manager; and an adapter that stores data characterizing the given schema, the adapter being configured to convert the translated forward migration trigger into a forward migration update that employs the given schema;

wherein the upgrade system manager is further configured to determine whether data received from an application configured to produce data for the upgrade database is to be provided to the legacy database; and wherein the application is a given application and the legacy system manager is configured to:

receive data from another application; and update the legacy database based on the data received from the another application by employing the another schema.

21. The system of claim 20, wherein the upgrade system manager is further configured to update the upgrade database based on the forward migration update, such that the update to the legacy database is forward migrated to the upgrade database.

22. A computer-implemented method comprising:

receiving data from an application;

providing the data to an upgrade database that employs a given schema and to a legacy database that employs another schema, wherein the upgrade database and the legacy database are each stored in one or more non-transitory memories;

determining whether to update the data in the legacy database, the determination being based on a type of the data being compatible with the legacy database, and in response to the determination of the type of data being compatible with the legacy database, updating the legacy database, wherein the data received from the application is not provided to the legacy database if the data is a given type of data and provided to the legacy database if the data is another type of data;

providing a forward migration trigger in response to detecting an update to the legacy database; and updating the upgrade database based on the data and the forward migration trigger, wherein the upgrade database contains a superset of data stored at the legacy database that employs another schema, wherein the legacy database and the upgrade database are both online concurrently.

23. The method of claim 22, wherein the data is the another type of data, the method further comprising:

updating the legacy database by employing the another schema; and providing a forward migration trigger that characterizes the update of the legacy database, wherein the updating of the upgrade database is performed in response to receiving the migration trigger.

24. The method of claim 23, further comprising:

migrating a director to a server that includes the upgrade database; and retiring the legacy database.

25. The method of claim 22, further comprising:

routing the data received from the application from an upgrade server associated with the upgrade database to a legacy server associated with the legacy server via an application programming interface (API) of the legacy server;

updating the legacy database based on the data received via the API of the legacy server; and forward migrating the update of the legacy database to the upgrade database.

\* \* \* \* \*